(12) United States Patent
Aonuma

(10) Patent No.: US 7,782,483 B2
(45) Date of Patent: Aug. 24, 2010

(54) IMAGE FORMING SYSTEM, IMAGE FORMING APPARATUS, IMAGE PROCESSING APPARATUS AND STORAGE MEDIUM READABLE BY COMPUTER

(75) Inventor: Koki Aonuma, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1221 days.

(21) Appl. No.: 11/356,960

(22) Filed: Feb. 21, 2006

(65) Prior Publication Data

US 2006/0203260 A1 Sep. 14, 2006

(30) Foreign Application Priority Data

Feb. 21, 2005 (JP) ............................. 2005-044826

(51) Int. Cl.
*G06K 15/00* (2006.01)
(52) U.S. Cl. .................. 358/1.9; 358/1.2; 358/3.21; 358/3.26; 358/1.11; 358/448; 358/3.02; 358/3.06; 358/3.07; 358/3.09; 358/3.11; 358/3.12; 358/3.13; 382/258; 382/298; 382/299
(58) Field of Classification Search ................ 358/3.02, 358/3.06, 3.07, 3.09, 3.12, 3.13, 3.21, 3.26, 358/1.9, 1.11, 1.2, 448; 382/258, 298, 299
See application file for complete search history.

(56) References Cited

U.S. PATENT DOCUMENTS 5,602,572 A * 2/1997 Rylander .................. 358/3.09
7,016,082 B2 * 3/2006 Rozzi ..................... 358/3.28
7,295,714 B2 * 11/2007 Koike .................... 382/254
2003/0007185 A1 * 1/2003 Aozzi ..................... 358/3.06
2004/0001640 A1 * 1/2004 Koike .................... 382/258

FOREIGN PATENT DOCUMENTS

| JP | 6-139348 | 5/1994 |
|---|---|---|
| JP | 6-189087 | 7/1994 |
| JP | 10-108007 | 4/1998 |
| JP | 2001-186333 | 7/2001 |
| JP | 2001-203883 | 7/2001 |

* cited by examiner

*Primary Examiner*—Twyler L Haskins
*Assistant Examiner*—Kent Yip
(74) *Attorney, Agent, or Firm*—Baker Botts L.L.P.

(57) ABSTRACT

An image forming system includes: a data conversion unit that converts first image data into second image data; and an image output unit that outputs an image obtained by reproducing the second image data. The data conversion unit includes: a determination unit which divides the first image data into a dot block each includes plural pieces of dot data, and determines whether or not an array of dot data included in each dot block corresponds to a specific array; and a replacement unit which replaces the data out of the second image data, which is located in a portion corresponding to the dot block, with first replacement data including image forming dot data with which an image is formed. The specific array includes a first array in which the dot data to be thinned out is configured as the image forming dot data, and the dot data not to be thinned out is configured as non-image forming dot data with which an image is not formed.

7 Claims, 14 Drawing Sheets

- IMAGE FORMING DOT
- NON-IMAGE FORMING DOT

FIG. 3
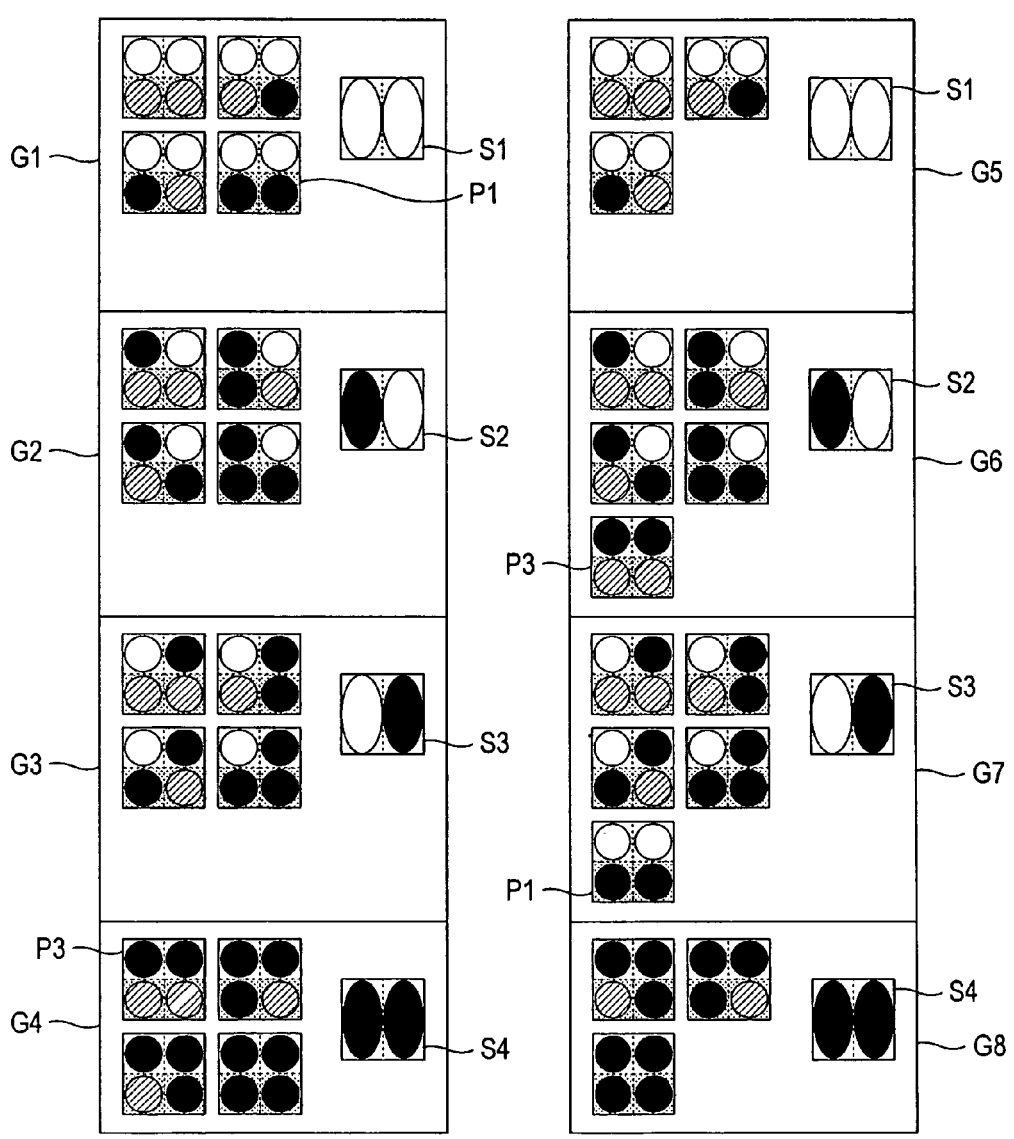
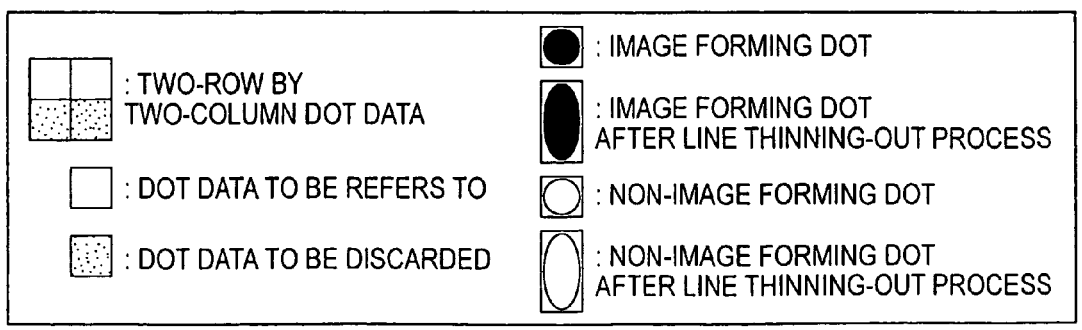

FIG. 11
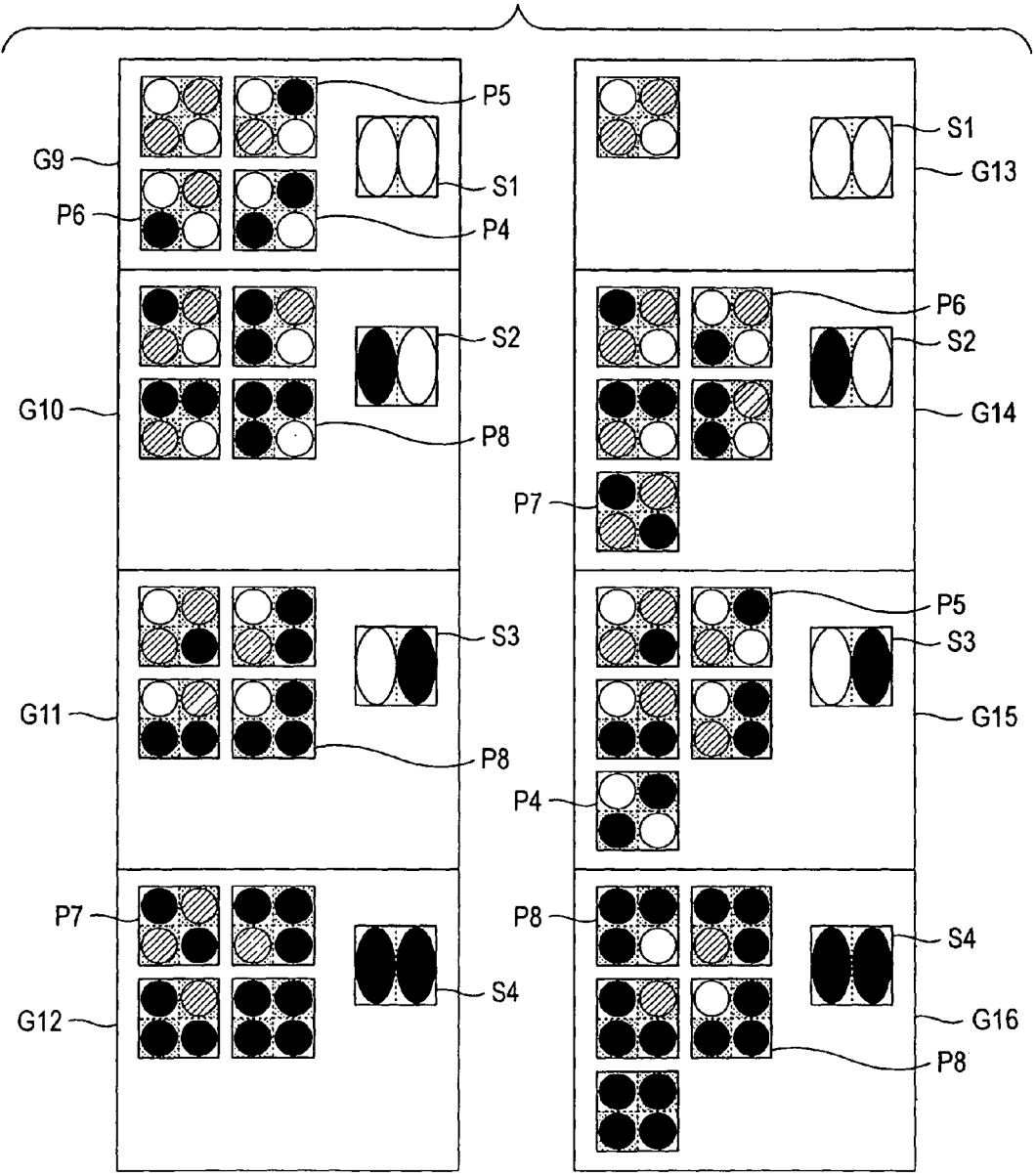
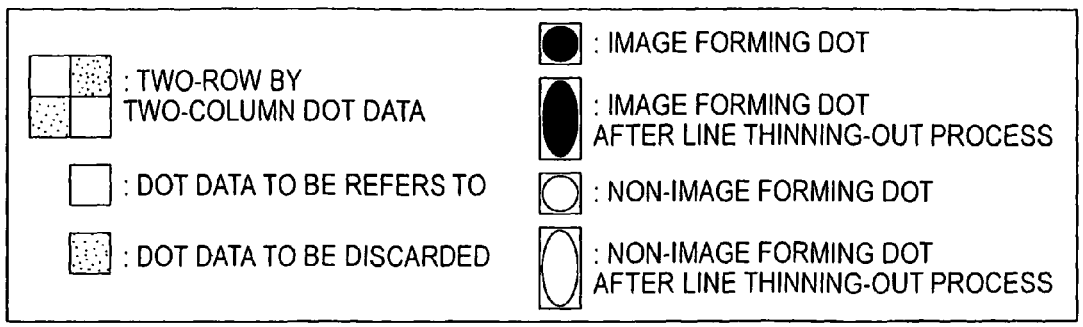

IMAGE FORMING SYSTEM, IMAGE FORMING APPARATUS, IMAGE PROCESSING APPARATUS AND STORAGE MEDIUM READABLE BY COMPUTER

CROSS-REFERENCE TO RELATED APPLICATION

This application is based on and claims the benefit of priority from the prior Japanese Patent Application No. 2005-44826, filed on Feb. 21, 2005; the entire contents of which are incorporated herein by reference.

TECHNICAL FIELD

The present invention relates to an image forming system, an image forming apparatus, an image processing apparatus and a computer-readable program.

BACKGROUND

In the field of image processing, in order to reduce a memory area for use, increase print speed, and so forth, the technology has been provided in which printing is performed in such a way that second image data obtained by thinning out first image data created by an application or the like, for example, line by line, to output an image obtained by reproducing the second image data (Please see JP-A-6-189087.)

SUMMARY

As this thinning-out method, for example, a method such as shown in FIG. 14 can be considered. In this method, first, initial image data, such as shown in FIG. 14A, created by an application or the like is read, and dot data configuring the dot pattern of the data is thinned out line by line, thereby creating second image data having a configuration such as shown in FIG. 14B. Print image data, such as shown in FIG. 14C, is then created by reproducing each line of this second image data into a thinned-out line.

However, when this technique is used, although a reduction in memory area for use, an increase in print speed, and the like are enabled, there is the problem that dots to be printed are dropped out due to the thinning out. Particularly, in the case of a thin line extending along a thinning-out line, such as the transverse line of "A" in FIG. 14A, the dots to be printed are dropped out to a large extent, so that there is the problem of resulting in an image output not reflecting the first image data.

The invention has been made based on circumstances such as aforementioned, and an object thereof is to provide a configuration in which a reduction in memory area for use, an increase in print speed, and the like are enabled by a thinning-out process, while image loss can be effectively prevented.

According to an aspect, an image forming system includes: a data conversion unit that thins out first image data configured by arranging dot data in matrix fashion and converts two-line data of the first image data into one-line data of second image data; and an image output unit that outputs an image obtained by reproducing the second image data converted by the data conversion unit. The data conversion unit includes: a determination unit which, when the dot data is thinned out, divides the first image data into a dot block each includes plural pieces of dot data, and determines whether or not an array of dot data included in each dot block corresponds to a preset specific array; and a replacement unit which, when the determination unit determines that the array in a dot block corresponds to the specific array, replaces the data out of the second image data, which is located in a portion corresponding to the dot block, with first replacement data including image forming dot data with which an image is formed. The specific array includes a first array in which dot data to be thinned out is configured as the image forming dot data, and dot data not to be thinned out is configured as non-image forming dot data with which an image is not formed.

According to another aspect, an image forming system includes: a data conversion unit that thins out first image data configured by arranging dot data in matrix fashion and converts two-line data of the first image data into one-line data of second image data; and an image output unit that outputs an image obtained by reproducing the second image data converted by the data conversion unit.

The data conversion unit divides the first image data into dot block which each include plural pieces of dot data, and converts the first image data into the second image data without causing a dot block density reversal phenomenon between the first image data and the image obtained by reproducing the second image data.

According to another aspect, an image processing apparatus includes: a data conversion unit that thins out first image data configured by arranging dot data in matrix fashion and converts two-line data of the first image data into one-line data of second image data. The data conversion unit divides the first image data into a dot block which each include plural pieces of dot data, and when image forming dot data with which an image is formed is arranged adjacent to each other in any dot block. The data conversion unit replaces the data out of the second image data, which is located in a portion corresponding to the dot block which includes the image forming dot data arranged adjacent to each other, with the data including the image forming dot data with which an image is formed.

According to another aspect, an image forming apparatus includes: a data conversion unit which thins out first image data configured by arranging dot data in matrix fashion and thereby converts two-line data of the first image data into one-line data of second image data; and an image output unit which outputs an image obtained by reproducing the second image data converted by the data conversion unit. The data conversion unit includes: a determination unit which, when the dot data is thinned out, divides the first image data into dot blocks which each include plural pieces of dot data, and determines whether or not the array of dot data included in each dot block corresponds to a preset specific array; and a replacement unit which, when the determination unit determines that the array in a dot block corresponds to the specific array, replaces the data out of the second image data, which is located in a portion corresponding to the dot block, with first replacement data including image forming dot data with which an image is formed. The preset specific array includes a first array in which all dot data to be thinned out is configured as the image forming dot data. All dot data not to be thinned out is configured as non-image forming dot data with which an image is not formed.

According to another aspect, a storage medium readable by computer stores a program of instructions executable by the computer to perform a function for forming an image based on first image data configured by arranging dot data in matrix fashion. The function including: thinning out the dot data so as to convert two-line data of the first image data into one-line data of second image data; outputting an image obtained by reproducing the second image data converted by the data conversion unit; dividing the first image data into dot blocks which each include plural pieces of dot data, when the data conversion unit thins out the dot data; determining whether or not the array of dot data included in each dot block corresponds to a preset specific array; and replacing the data out of the second image data, which is located in a portion corresponding to the dot block, with first replacement data including image forming dot data with which an image is formed, when the determination unit determines that the array in a dot block corresponds to the preset specific array; and configuring, as non-image forming dot data with which an image is not performed, the specific array including a first array in which all dot data to be thinned out is configured as the image forming dot data, and all dot data not to be thinned out is configured as non-image forming dot data with which an image is not formed.

BRIEF DESCRIPTION OF THE DRAWINGS

These and other objects and advantages of this invention will become more fully apparent from the following detailed description taken with the accompanying drawings in which:

FIG. 3 is an explanatory diagram illustrating a first array and a third array;

FIG. 11 is an explanatory diagram illustrating a first array, a second array, a third array and a fourth array;

DESCRIPTION OF ILLUSTRATIVE ASPECTS

Illustrative aspects will be described with reference to FIGS. 1 to 9.

1. Overall Configuration of System

Figure 1:
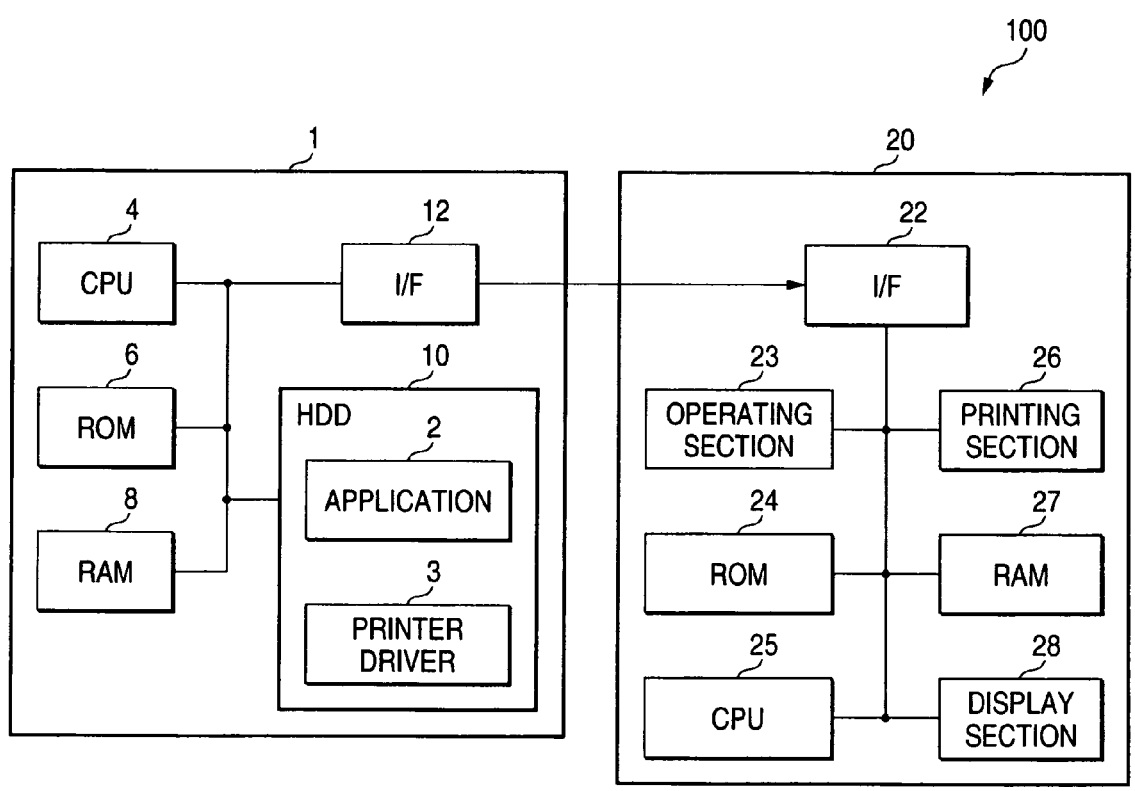
FIG. 1 is a block diagram illustrating an electrical configuration of an image forming system.

FIG. 1 is a block diagram illustrating the configuration of a printing system 100 (image forming system). The printing system 100 is provided with a computer 1, and a laser printer 20 (hereafter also simply called a printer 20) is connected to this computer 1. In FIG. 1, the computer 1 includes a CPU 4, a ROM 6, a RAM 8, an HDD (Hard Disk Drive) 10, an interface 12 and the like.

The HDD 10 stores various application programs 2 (hereafter also simply called applications 2), a printer driver 3, an OS (not shown) and the like. These applications 2 and printer driver 3 are installed on the HDD 10 utilizing, for example, programs transmitted from a storage medium, such as a CD-ROM (not shown), and a prescribed server.

The applications 2, which are various application programs such as word-processing software and image creating software, are loaded into a predetermined region of the RAM 8 when processing is executed, and are executed by the CPU 4. The applications 2 are thus executed, whereby an operator can create an image, such as a character and a figure, using the word-processing software or the like.

The interface 12 is interposed between the printer driver 3 and the printer 20, and this printer interface 12 exerts control to transmit to the printer 20 the output data (second image data) received from the printer driver 3.

The printer 20 includes an interface 22 which receives the data transmitted from the computer 1, and further includes a printing section which forms an image using the received data. The printing section 26 is configured to output an image obtained by reproducing the second image data to be described later, and serves the image output unit. Additionally, the printer 20 includes a ROM 24, a CPU 25, a RAM 27 and the like, and further includes an operating section 23 on which a user makes input, a display section 28 on which various displays are performed, and the like.

The printer driver 3, which configures part of the computer-readable program, is prepared in response to the model of the printer 20, then loaded into a predetermined region of the RAM 8 and executed by the CPU 4. In this aspect, the printer driver 3 and a to-be-described program (see FIG. 8) on the printer side serve the computer-readable program.

2. Description of Features

The characteristic process of the printer driver 3 will now be described.

Figure 2A:
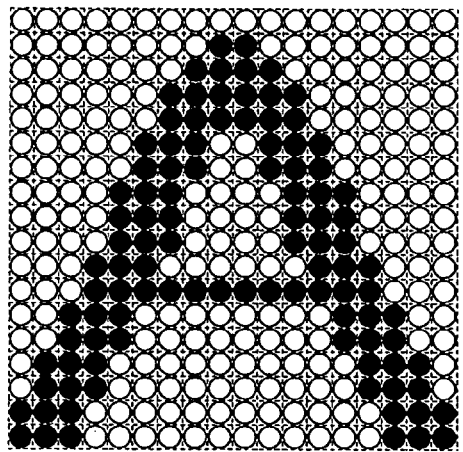
FIGS. 2A-2C are explanatory diagrams illustrating a data conversion process.

First, the outline of the process will be described. The image forming system 100 is configured as a system which forms an image based on first image data having dot data arranged in matrix fashion, such as shown in FIG. 2A. The system 100 is adapted to thin out dot data of the first image data and thereby convert two-line data of the first image data into one-line data of the second image data. Specifically, out of the first image data, dot data which configures rows is thinned out every other row by a data conversion unit to be described later, thereby converting the first image data into the second image data. In the first image data, this dot data configuring the rows configures dot lines extending along a main scan direction in the printing section 26, based on which the dot data is thinned out every other row in a sub-scan direction. The printing section 26 includes a laser light source which emits a laser beam, a polygon mirror which deflects the laser beam emitted by this laser light source, and a photoconductive drum which is scanned with the later beam deflected by the polygon mirror. A direction parallel to the scanning direction of the laser beam is referred to as the main scan direction, while a direction parallel to the rotating direction of the photoconductive drum is referred to as the sub-scan direction. In this aspect, the CPU 4 performs such a conversion process, and this CPU 4 serves the data conversion unit.

Figure 2B:
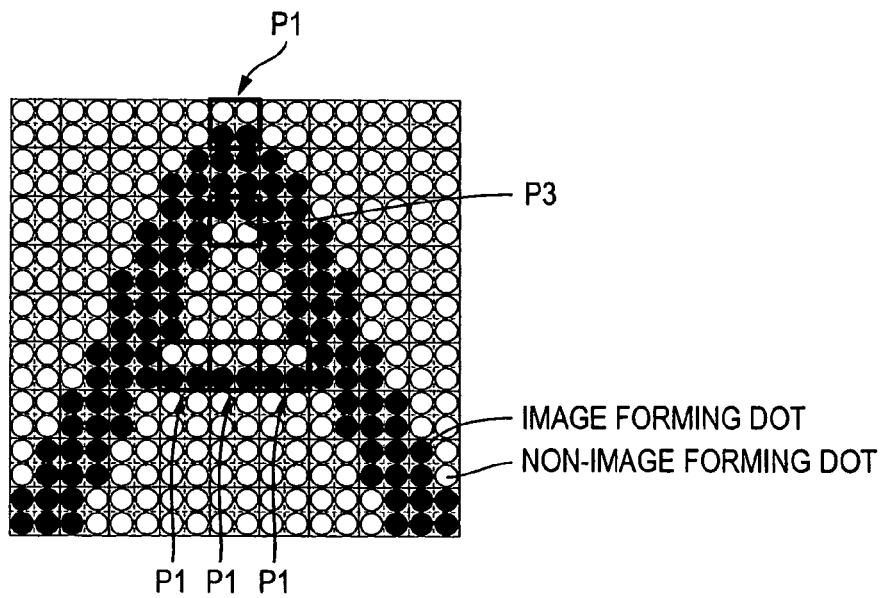

In this aspect, on the premise of such a thinning-out process and furthermore when dot data is thinned out, as shown in FIG. 2B, the first image data is divided into dot blocks which each include plural pieces of dot data. As shown in FIG. 2B, these dot blocks are each configured of two-row by two-column dot data. It is determined whether or not the array of dot data configuring each dot block corresponds to a preset specific array. This determination technique will be described below.

The dot blocks divided as in FIG. 2B configure patterns such as shown in the left side of FIG. 3, and are divided into groups, such as G1 to G4 in FIG. 3, by type of pattern. These groups G1 to G4 shown in the left side of FIG. 3 configure the following groups in response to the combination of the dot data remaining after the aforementioned thinning-out process. That is, group G1 shows a group in which the dot data remaining after the thinning-out process includes only non-image forming dot data, and groups G2 and G3 show a group in which the dot data remaining after the thinning-out process includes the combination of the non-image forming dot data and image forming dot data. Specifically, G2 shows a group in which the image forming dot data remains in the left half, and G3 shows a group in which the image forming dot data remains in the right half. Additionally, group G4 shows a group in which the dot data remaining after the thinning-out process includes only the image forming dot data. Groups G1 to G4 are the groups without a replacement process taken into consideration, and the use of a to-be-described reconversion method for reproducing the dot data remaining after the thinning-out process results in outputting images such as shown in S1 to S4. As used herein, the term image forming dot refers to a dot which is optically written onto the photoconductive drum by a laser beam and with which an image is formed using a developer (FIG. 2B). Furthermore, the term non-image forming dot refers to a dot which is not optically written onto the photoconductive drum by a laser beam and with which an image is not formed using the developer.

In each dot block thus configured, to focus on the dot block of array P1, an image such as shown in S1 is output in the dot block of array P1. In this case, all the image forming dot data which has initially occupied half of array P1 (two dots out of a total of four dots arranged in two rows and two columns are the image forming dot data) is lost during the image output, thus creating an output image not reflecting the initial first image data. In this aspect, in order to prevent such a problem, the configuration is such that array P1, such as aforementioned, is defined as the specific array and replaced with pre-prepared first replacement data to obtain an output such as shown in S3. Additionally, the configuration is such that array P3 to be described later is also replaced with second replacement data to obtain an output such as shown in S2. In other words, it can also be said that the data conversion process of this aspect (i.e., the thinning-out process with replacement taken into consideration) changes the groups of array P1 and array P3 to configure groups broken down by output mode, such as G5 to G8, in place of groups (groups configured based on the output image without replacement taken into consideration) such as G1 to G4 in FIG. 3.

Array P1 serves to the first array, and is, specifically, the array in the dot block of which all the dot data to be thinned out is configured as the image forming dot data, and all the dot data not to be thinned out is configured as the non-image forming dot data.

Figure 2C:
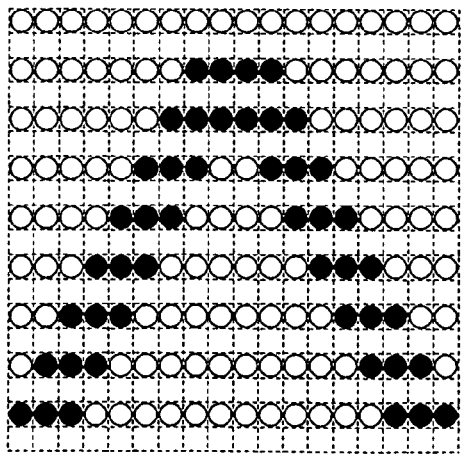

In this aspect, the first image data, such as shown in FIG. 2A, is not merely thinned out as shown in FIG. 2C, but is divided into blocks as shown in FIG. 2B, thus comparatively determining the arrays block by block. Thus, the configuration is such that the data in a portion corresponding to the dot block which corresponds to array P1 is replaced with first replacement data P1' which includes the combination of the image forming dot data and the non-image forming dot data. In this aspect, the CPU 4 serves the determination unit and a replacement unit for performing such a process.

This aspect adopts a conversion method such as aforementioned, so that a thinning-out process can be satisfactorily performed, and the image loss can be efficiently suppressed in the thinning-out process. In particular, in the case of a dot block corresponding to array P1 (first array) such as afore-mentioned, although the dot block has included considerable image forming dot data (two dots out of four dots arranged in two rows and two columns are the image forming dot data) in the initial first image data, only the non-image forming dot data remains in the dot data remaining after being thinned out. Thus, unless any measures are taken, the image loss due to thinning out becomes specifically prominent. In this aspect, dot data corresponding to such array P1 is replaced with the first replacement data which includes the image forming dot data, thus effectively minimizing the image loss.

Additionally, dot data of array P1 such as aforementioned includes the image forming dot data and the non-image forming dot data, and it is preferable, even from the viewpoint of density, to output an image reflecting such data as much as possible. The configuration of this aspect is such that a portion corresponding to array P1 such as shown in FIG. 2B is replaced with the first replacement data P1' which includes the combination of the image forming dot data and the non-image forming dot data. Therefore, as shown in FIG. 4B, an output image P1" in the portion corresponding to array P1 forms an appropriate density image reflecting the first array as shown in S3 (see FIG. 3). In other words, the dot block corresponding to P1 includes the image forming dot data having two dots out of four dots arranged in two rows and two columns and has a density of 50%, while P1" also includes an image portion occupying 50% thereof and a non-image portion occupying the other 50%, so that P1 and P1" coincide in density with each other.

Furthermore, in this aspect, an array to be comparatively determined is set separately from the aforementioned specific array. Specifically, array P3 shown in FIG. 3 is set. This array P3 serves the third array, in the dot block of which all the dot data to be thinned out is configured as the non-image forming dot data, and all the dot data not to be thinned out is configured as the image forming dot data. In this array P3, as shown in the left side of FIG. 3, unless any measures are taken, all the non-image forming dot data which has initially occupied half of array P3 is lost by thinning out, and all the remaining image forming dot data is reproduced to output S4. Accordingly, a much wider image forming portion than the initial first image data occurs in an image which is formed in the end, thus resulting in formation of an image not reflecting the first image data.

Figure 4A:
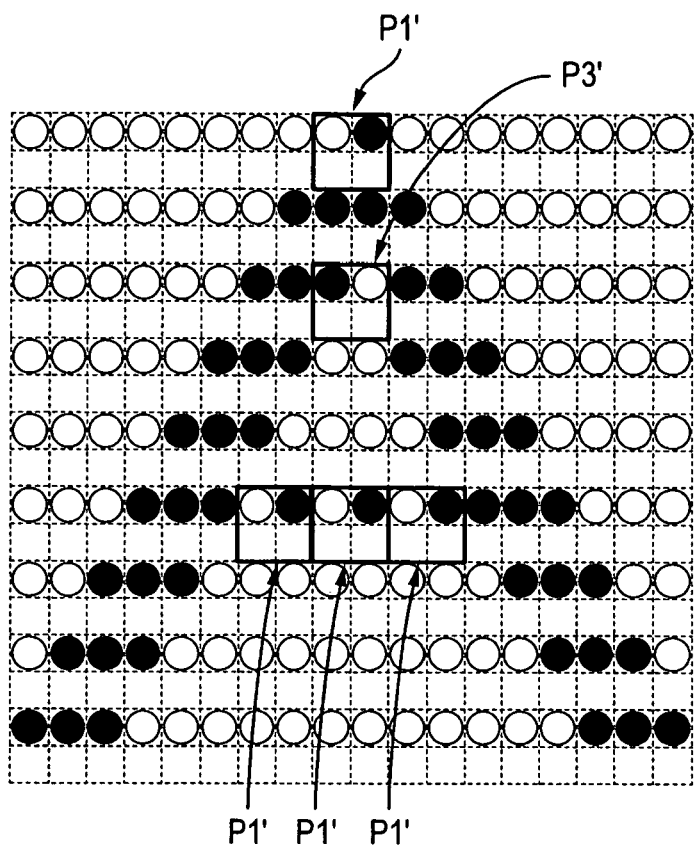
FIGS. 4A, 4B are explanatory diagrams illustrating the data conversion process.
Figure 4B:
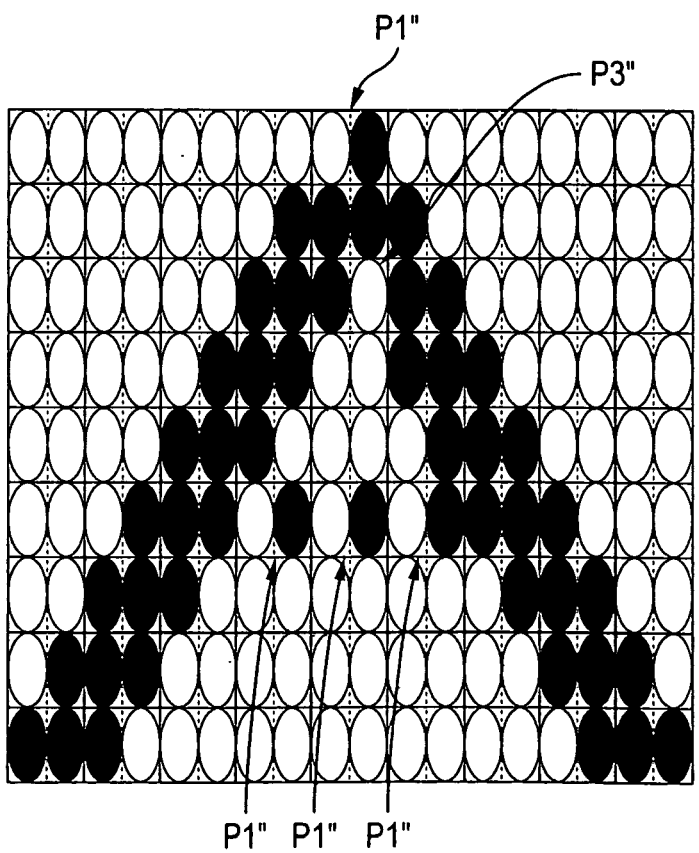

In this aspect, data in a portion corresponding to the dot block which corresponds to array P3 as shown in FIG. 2B is, as shown in FIG. 4A, replaced with second replacement data P3' which includes the combination of the image forming dot data and the non-image forming dot data, thus converting the first image data into the second image data. In this way, an output image P3" in the portion corresponding to array P3 forms an appropriate density image reflecting the third array as shown in S2 (see FIG. 3). Accordingly, the first image data can be reflected more properly, so that a density reversal phenomenon can be effectively prevented.

Replacement data is thus applied to the portions of first array P1 and third array P3, thereby suppressing the image loss and outputting an appropriate density image as shown in FIG. 4B.

The flow of a process till the first image data is output as print data will now be described using a flowchart.

Figure 5:
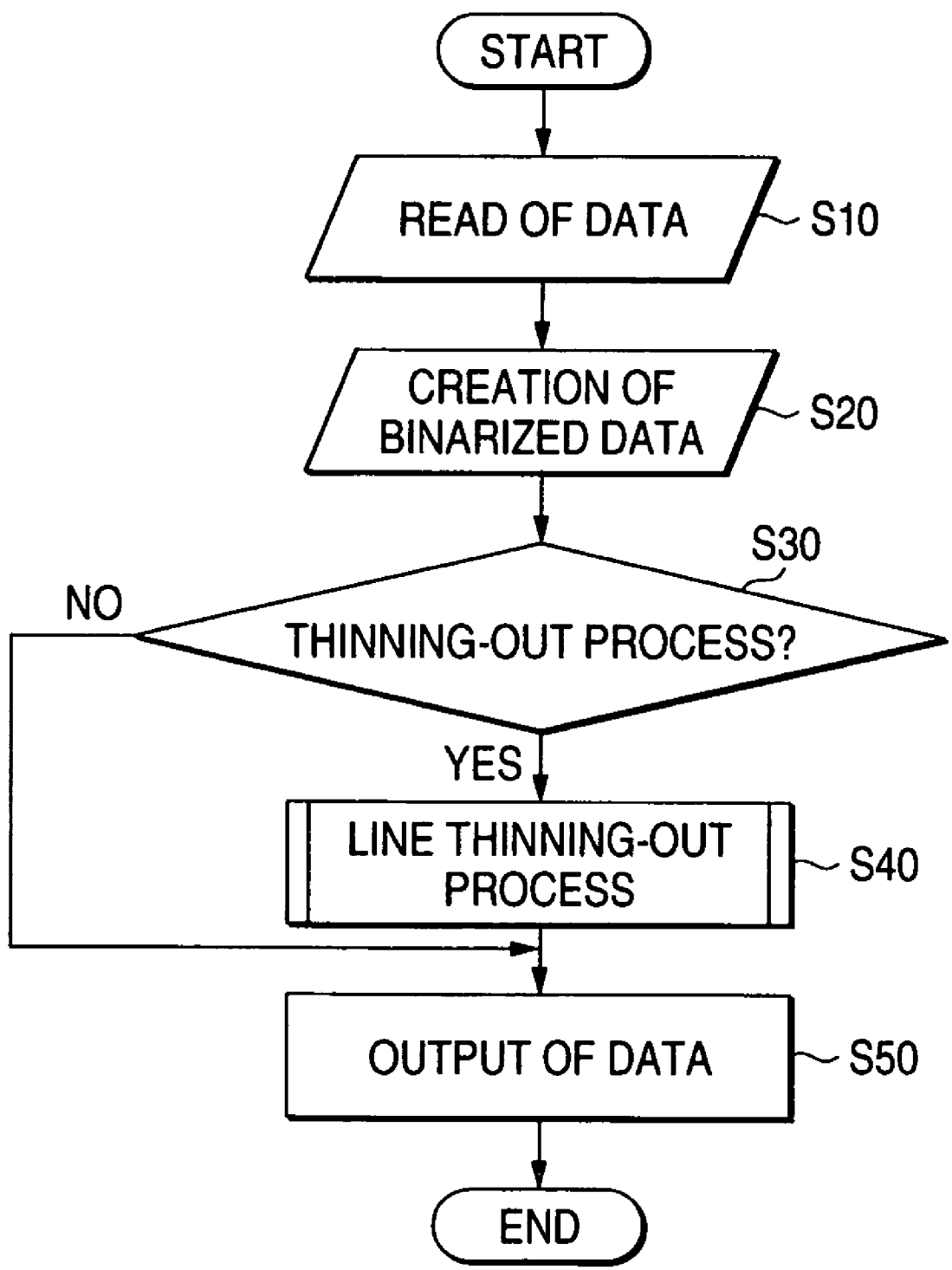
FIG. 5 is a flowchart illustrating the flow of the data conversion process.
Figure 6:
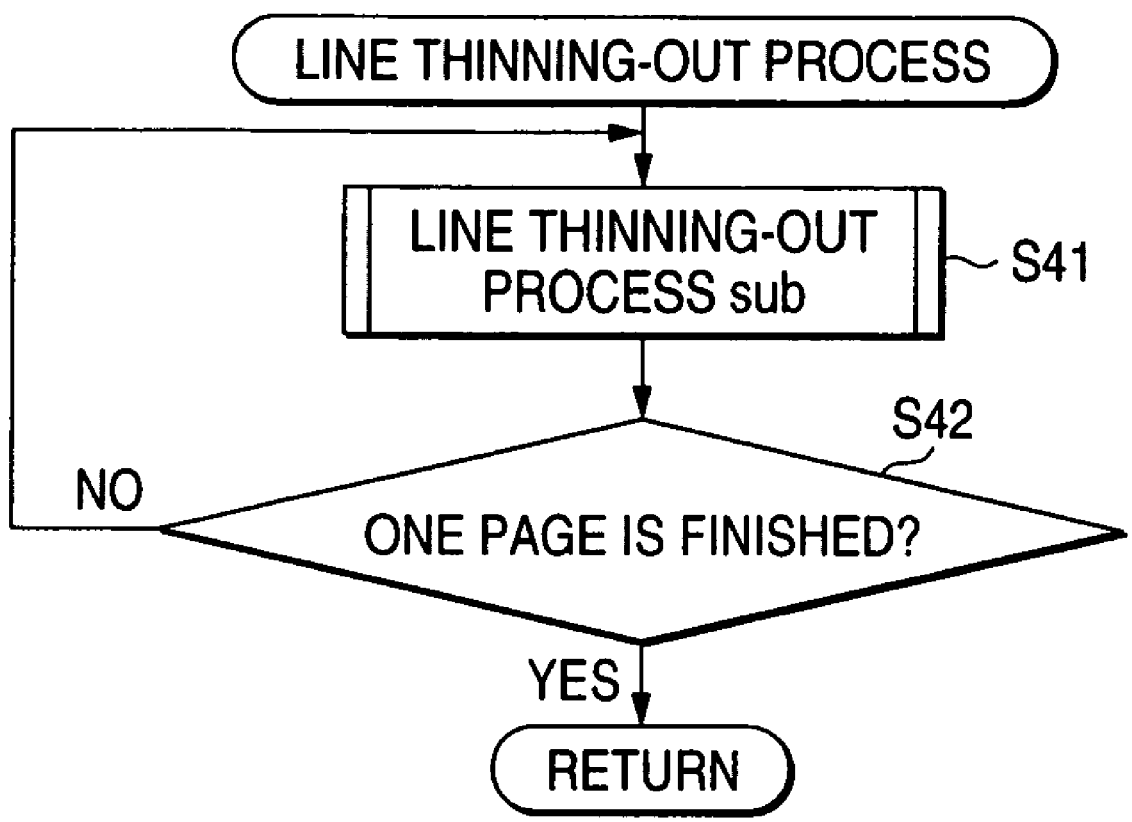
FIG. 6 is a flowchart showing the flow of a line thinning-out process.

As shown in FIG. 5, first, the printer driver 3 shown in FIG. 1 reads the image data created in accordance with the instruction from the application 2 (S10). The first image data obtained by binarizing this image data is then created (S20). It is then determined whether or not a data output target printer is the type in which the thinning-out process should be performed (S30). If not, the process moves to "No" in S30, wherein the first image data is output to the data output target printer without being subjected to the thinning-out process. Conversely, if the thinning-out process should be performed, then in S30, the process moves to "Yes", and in S40, a line thinning-out process is executed. After the line thinning-out process is finished, the second image data subjected to the process is output to the printer (S50).

The line thinning-out process (FIG. 5: S40) will now be described with reference to FIGS. 6 and 7. The line thinning-out process is a process performed page by page, in which a line thinning-out process sub-routine of S41 is repeated until one page is finished.

Figure 7:
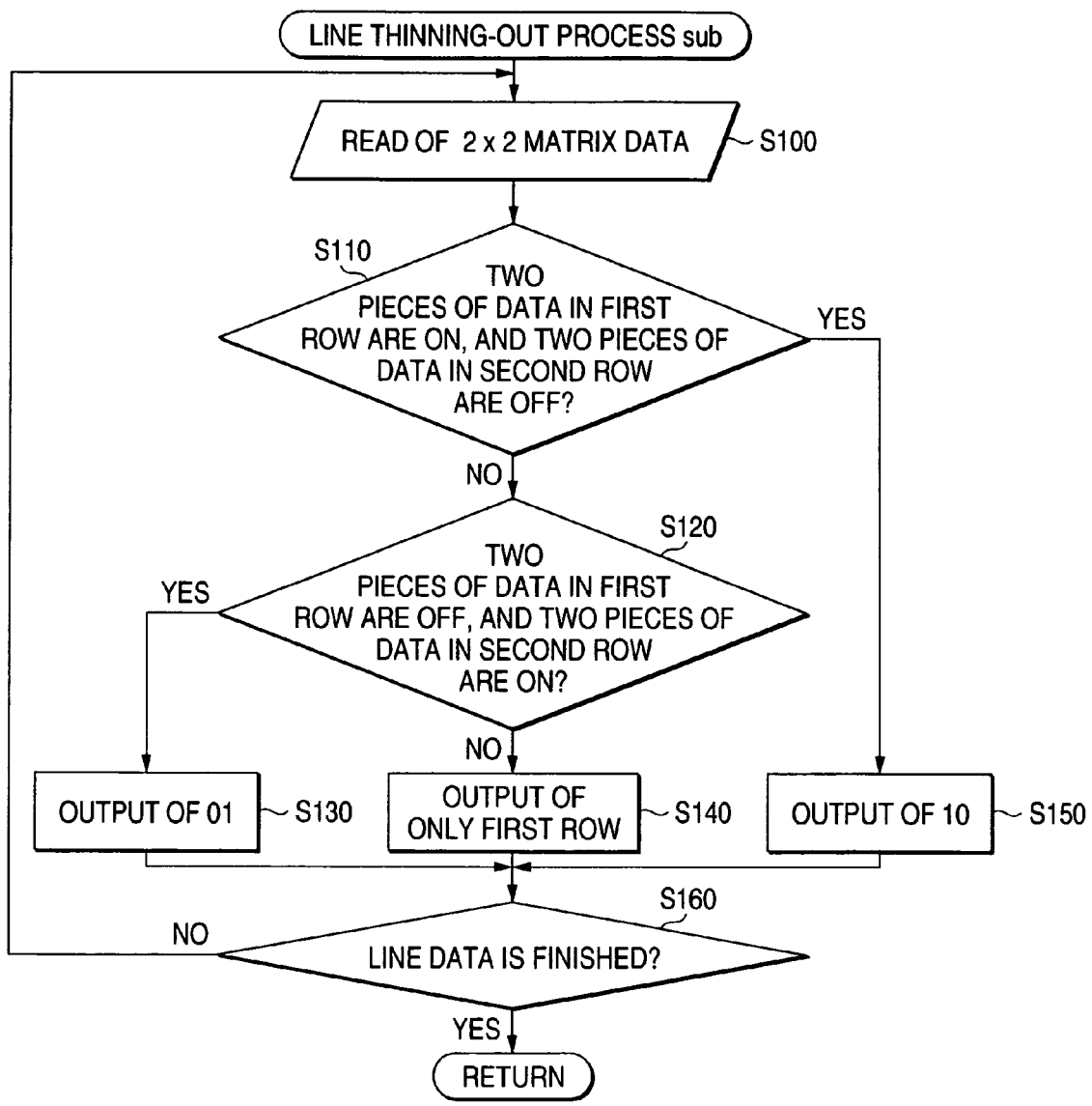
FIG. 7 is a flowchart showing a line thinning-out process sub-routine.
Figure 9:
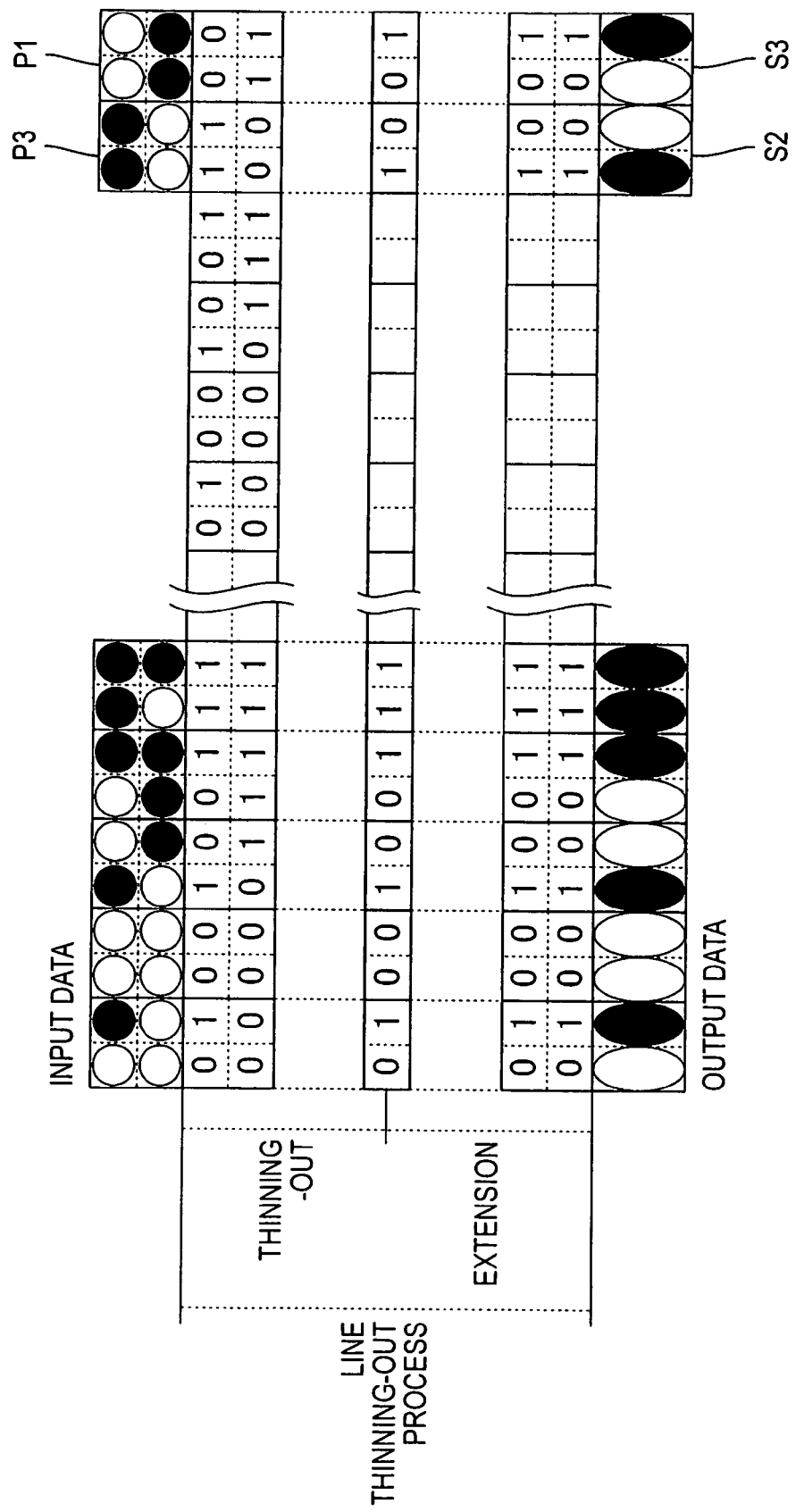
FIG. 9 is an explanatory diagram illustrating the conversion from first image data to second image data and the reproduction of the second image data.

In the line thinning-out process sub-routine of FIG. 7, first, in S100, two-row by two-column matrix data (dot data configuring a dot block) is read. In S110, it is then determined whether or not both pieces of dot data are on in the first row and both pieces of matrix data are off in the second row, i.e., whether or not the matrix data corresponds to the third array. If the matrix data corresponds to the third array, then in S110, the process moves to "Yes", and in S150, a value "1" "0" (i.e., data (second replacement data) showing an image forming dot on the left side and a non-image forming dot on the right side) is output as data corresponding to the corresponding dot block (see array P3 in FIG. 9). Additionally, if "No" in S110, it is determined whether or not both pieces of matrix data are on in the first row and off in the second row, i.e., whether or not the matrix data corresponds to the first array. If the matrix array corresponds to the first array, then in S120, the process moves to "Yes", and in S130, a value "0" "1" (i.e., data (first replacement data) showing a non-image forming dot on the left side and an image forming dot on the left side) is output as data corresponding to the corresponding dot block (see array P1 in FIG. 9). If "No" in S120, only the data in the first row is output (see portions other than arrays P1 and P3 in FIG. 9). FIG. 9 conceptually shows the process related to this flowchart.

In S160, it is then determined whether all the lines are finished or not. If all the lines are not finished, the process moves to "No", in which the process from S100 to S150 is repeated until all the lines are finished. If all the lines are finished, then in S160, the process moves to "Yes", in which the sub-routine is brought to an end, and the process then moves to S42 in FIG. 6. The data thinned out is stored in a storage unit such as RAM 8 shown in FIG. 1. The line thinning-out process is performed until one page is finished, and the data thinned out, which has been stored after one page is finished, is output to the printer 20.

The process on the printer 20 side will now be described.

Figure 8:
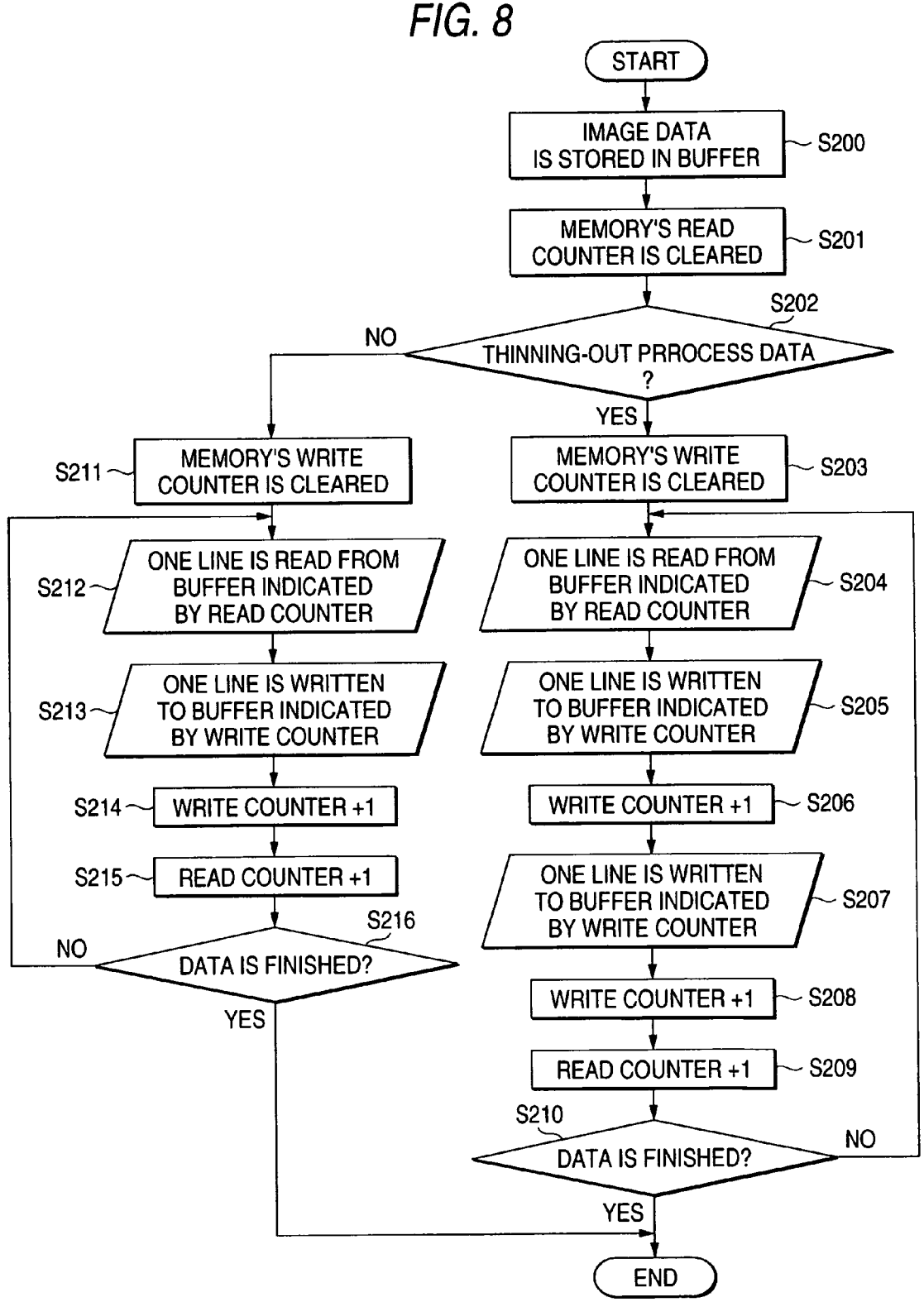
FIG. 8 is a flowchart of the process of creating a print image on the side of a printer.

FIG. 8 shows a flowchart of the process of creating a print image on the printer 20 side. First, the image data transmitted from the computer 1 is stored in a buffer including the RAM 24 and the like (S200). Subsequently, a memory's write counter is cleared (S201). It is then determined whether this data is thinning-out process data or not, i.e., the second image data or not. If it is the thinning-out process data, then in S202, the process moves to "Yes", wherein a memory's read counter is cleared (S203). Thus, in S204, one line of the second image data is read from a buffer indicated by the read counter. Subsequently, one line is written to a buffer indicated by the write counter (S205). Thereafter, the write counter is incremented by 1 (S206), and one line is written to a buffer indicated after the increment (S206). In this process from S205 to S207, the process is performed in such a way that the data thinned out is reproduced and written to the buffer, wherein the data configuring a single line is extended to become equivalent to two lines (i.e., extended along the sub-scan direction). Thus, in S208, the write counter is incremented by 1 in order to write the next line, and the read counter is incremented by 1 in order to read the next line of the second image data. The process from S204 to S209 is then repeated until the second image data is finished. If all the process of reproducing the second image data is completed, then in S210, the process moves to "Yes" to bring this process to an end.

Conversely, if the image data transmitted from the computer 1 is not the thinning-out process data, then in S211, the process moves to "No", wherein, first, the memory's write counter is cleared. In S212, the image data is read line by line from a buffer indicated by the read counter, and in S213, one line is written to a buffer indicated by the write counter. Subsequently, the write counter is incremented by 1 in order to write the next line (S214), and furthermore, the read counter is incremented by 1 in order to read the next line (S215). It is then determined whether or not all the data transmitted from the computer has been written to the buffer (S216). If all the data has been written, this process is brought to an end. If the data has not been written, then in S216, the process moves to "No", wherein the process from S212 to S215 is repeated.

When such a process is performed to create and store print image data, printing is performed in the printing section 26 based on the print image data stored. The printing section 26 may be configured, when outputting a dot image corresponding to the image forming dot data, to exert output control to form the dot image which has a larger width than a reference dot width and has a smaller width than a dot width twice the reference dot width. In the invention, the main scan direction is referred to as a width direction, and the dot width, in which the image forming dot data coincides with the non-image forming dot data, is referred to as the reference dot width. The width of the image which is drawn with the image forming dot data when printed may be made larger than the width of the region occupied by the non-image forming dot data. This control is exerted by adjusting under PWM control the exposure for drawing the image forming dot data.

In this aspect, when printing the second image data, the configuration is such that printing is performed after each line is reproduced twice as large, but a printing process may be performed without the reproduction. For example, the control may be exerted in such a way that print speed is doubled without pre-creating any reproduced data and each line of the second image data is thereby drawn twice as large.

Next, another illustrative aspect will be described with reference to FIGS. 10 to 13D.

As with the case of the above illustrative aspect, an image forming system is configured as the system of forming an image based on first image data configured by arranging dot data in matrix fashion, and the overall configuration thereof is the same as that in FIG. 1. Additionally, similar to the above illustrative aspect, in the another illustrative aspect, by thinning out dot data, two-line data of the first image data is converted into second image data which is one-line data, thus outputting an image obtained by reproducing the converted second image data.

Figure 10A:
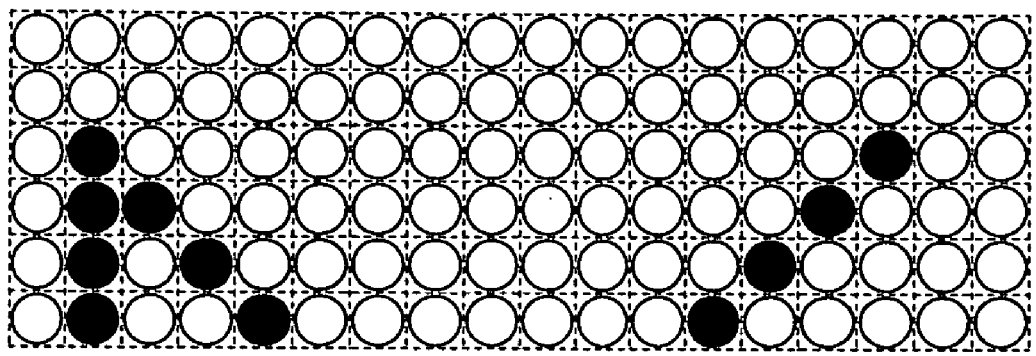
FIG. 10 is explanatory diagrams illustrating zigzag thinning out.
Figure 10B:
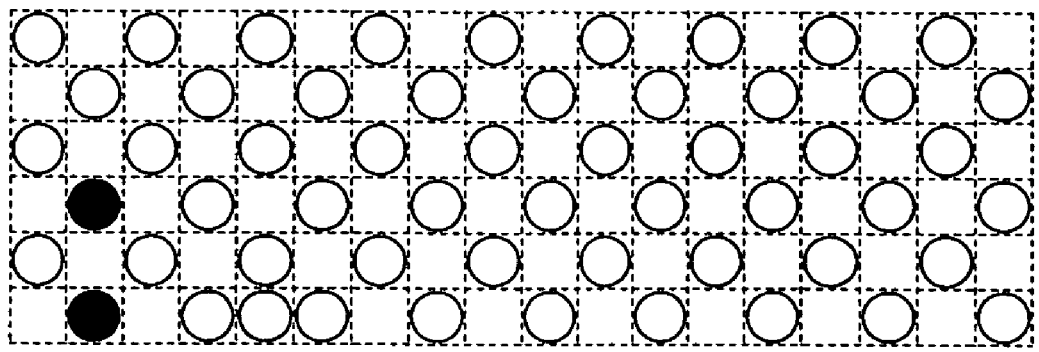

In contrast, in the another illustrative aspect, as shown in FIGS. 10A, 10B, the first image data is converted into the second image data by thinning out dot data of the first image data in a zigzag manner. As used herein, the term "zigzag thinning-out method" refers to the method in which every other piece of dot data of the first image data illustrated in FIG. 10A is thinned out in each row as well as in each column as shown in FIG. 10B.

In the another illustrative aspect as well, to thin out dot data, the first image data is divided into dot blocks which each include plural pieces of dot data, and it is determined whether or not the array of the dot data included in each dot block corresponds to a preset specific array. If it is determined that the array in a dot block corresponds to the specific array, the data in a portion corresponding to the dot block is replaced with the first replacement data including image forming dot data with which an image is formed. In the another illustrative aspect, each dot block is configured of two-row by two-column dot data.

The specific array of the another aspect is array P4 (first array) such as shown in FIG. 11, i.e., includes the array in the dot blocks of which all the dot data to be thinned out is configured as the image forming dot data, and all the dot data not to be thinned out is configured as non-image forming dot data with which an image is not formed.

Additionally, the specific array also includes a second array in the dot blocks of which the dot data to be thinned out is configured of the image forming dot data and the non-image forming dot data, and all the dot data not to be thinned out is configured of the non-image forming dot data. In the another illustrative aspect, arrays P5 and P6 shown in FIG. 11 correspond to the second array.

Out of the second data, the data in portions corresponding to the dot blocks which have been determined to correspond to arrays P4 (first array), P5 (second array) and P6 (second array) is replaced with the first replacement data including the combination of the image forming dot data and the non-image forming dot data. As shown in G14 and G15 out of output groups G13 to G16 on the right side of FIG. 11, images such as shown in S2 and S3 are output for these arrays P4 to P6.

A replacement process is thus performed based on the specific array (i.e., arrays P4, P5 and P6), thereby effectively preventing the image loss.

Additionally, in the another illustrative aspect, a third array (i.e., array P7) and a fourth array (i.e., array P8) are preset. In the dot block of the third array, all the dot data to be thinned out is configured as the non-image forming dot data, and all the dot data not to be thinned out is configured as the image forming dot data. In the dot block of the fourth array, three pieces of image forming dot data are included in each dot block, and all the dot data to be thinned out is configured as the image forming dot data. Thus, the first image data is converted into the second image data in such a way that the data in a portion corresponding to the dot block which corresponds to the third array (array P7) is replaced with the second replacement data including the combination of the image forming dot data and the non-image forming dot data. And, the first image data is converted into the second image data in such a way that the data in a portion corresponding to the dot block which corresponds to the fourth array (array P8) is replaced with the third replacement data including the combination of only the image forming dot data. In other words, array P7 is set to belong to group G14, and array P8 is set to belong to group P8.

In the dot block corresponding to the third array (array P7), i.e., in the dot block of the array in which all the dot data to be thinned out is configured as the non-image forming dot data and all the dot data not to be thinned out is configured as the image forming dot data, although this dot block has included the combination of the non-image forming dot data and the image forming dot data in the initial first image data, all the dot data remaining after being thinned out becomes the image forming dot data. Accordingly, when this image forming dot data is reproduced, a dot block which has a much wider image forming region than the portion corresponding to the first image data (i.e., a dot block including only image forming dots) is configured. In contrast, in the dot block corresponding to the fourth array (array P8), i.e., in the dot block in which three pieces of image forming dot data are included and all the dot data to be thinned out is the image forming dot data, although this dot block has had a large proportion of image forming dots in the initial first image data, image forming dots and non-image forming dots remain half-and-half, and an image formed in the end becomes an image in which image forming dots and non-image forming dots are configured half-and-half.

Figure 12:
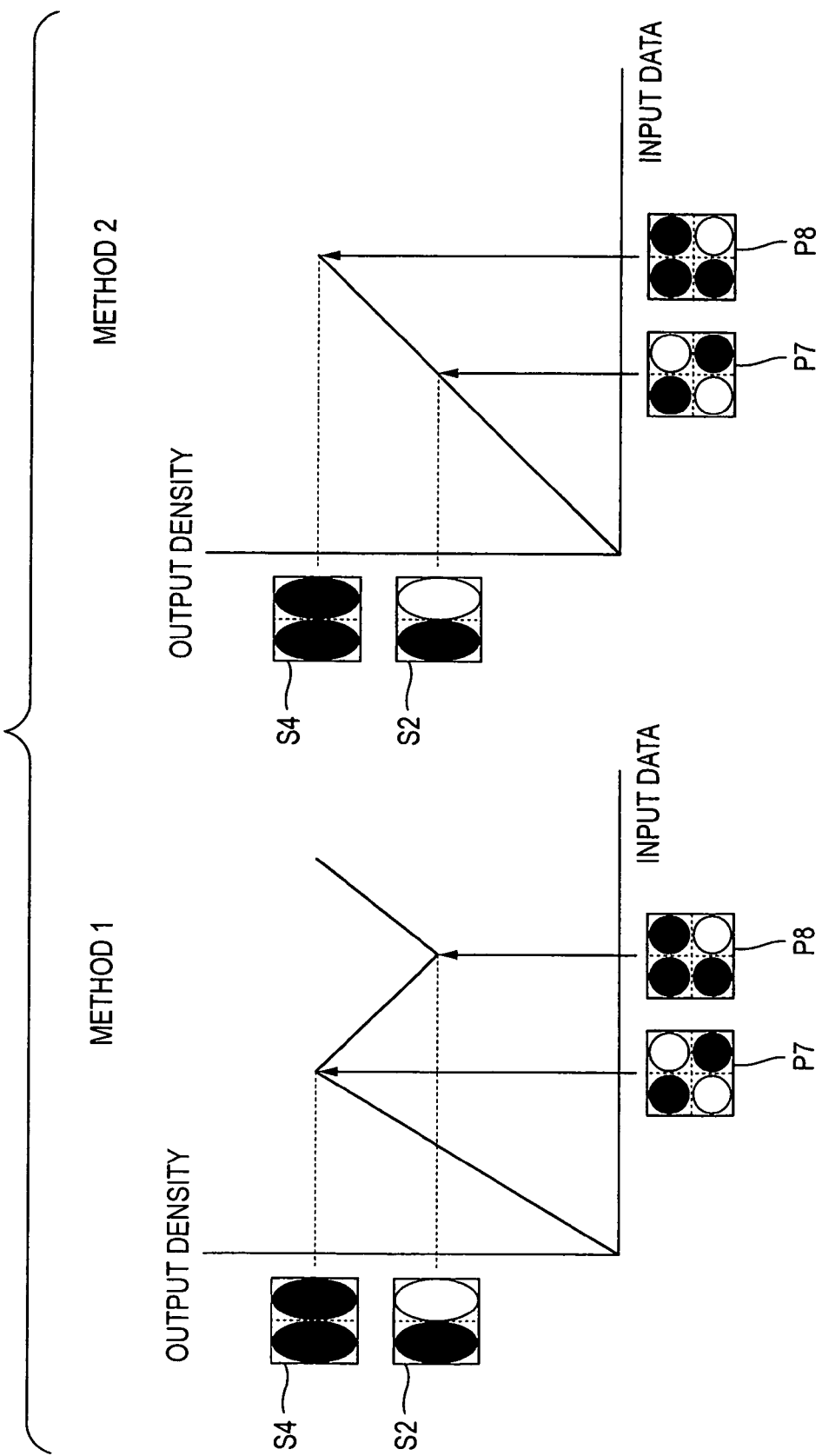
FIG. 12 is an explanatory diagram illustrating a density reversal phenomenon.

Unless any measures are taken against such a third array (array P7) or fourth array (array P8), as shown in method 1 of FIG. 12, the fourth array portion, which has been higher in density than the third array portion in the initial first image data, becomes lower in density than the third array portion in an image formed in the end, thus causing the density reversal phenomenon.

In contrast, method 2 (i.e., a method according to the another illustrative aspect is configured as follows. That is, the data in a portion corresponding to the dot block which corresponds to the third array (array P7) is replaced with the second replacement data including the combination of the image forming dot data and the non-image forming dot data. And, the data in a portion corresponding to the dot block which corresponds to the fourth array (array P8) is replaced with the third replacement data including the combination of only the image forming dot data. With such a configuration, in an image formed in the end, the portion obtained by converting the fourth array (array P8) becomes higher in density than the portion obtained by converting the third array (array P7), so that the density reversal phenomenon can be effectively prevented.

Figures 13A, 13B, 13C, 13D:
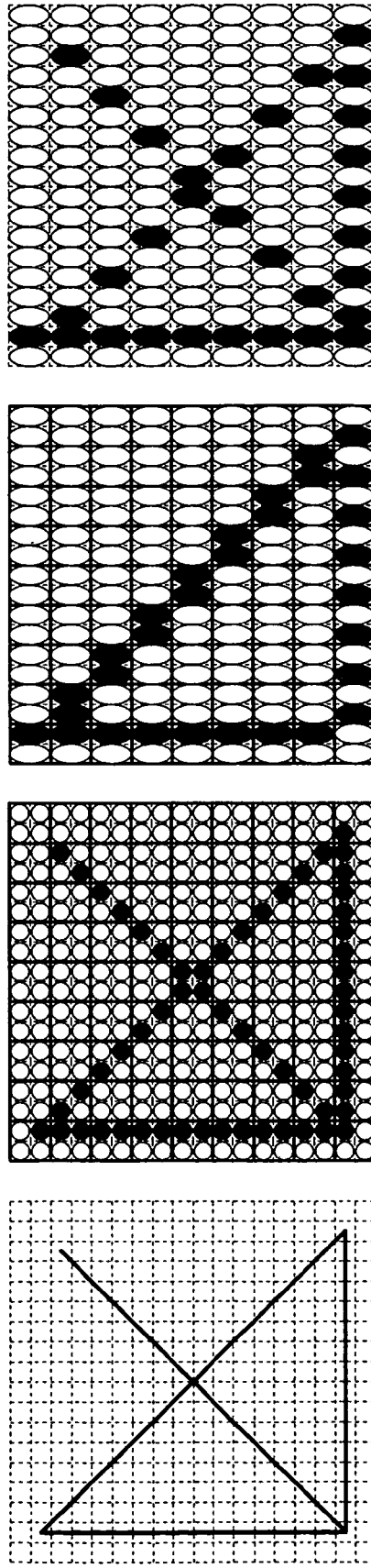
FIGS. 13A-13D are explanatory diagrams illustrating data conversion and output.
Figure 14A:
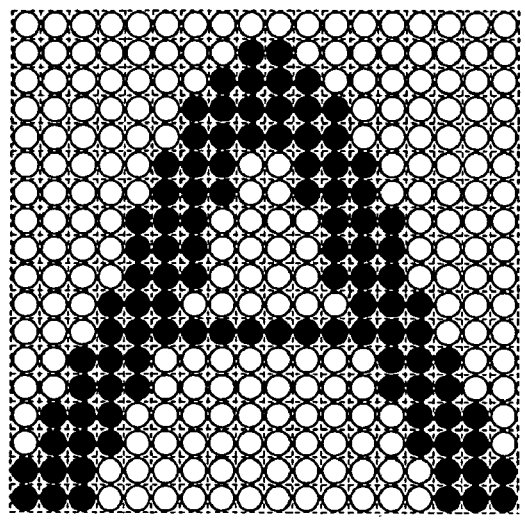
FIGS. 14A-14C are explanatory diagrams illustrating a related art thinning-out process.
Figure 14B:
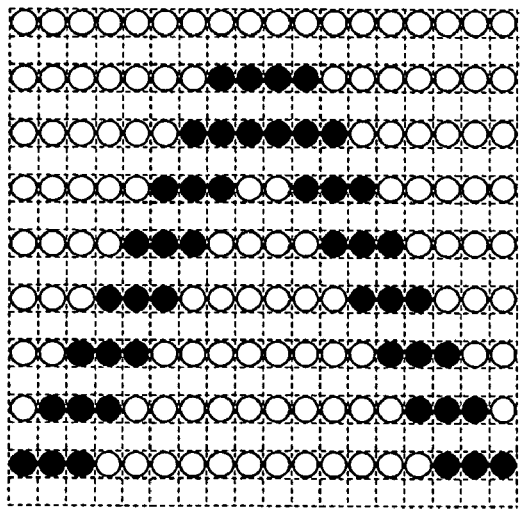
Figure 14C:
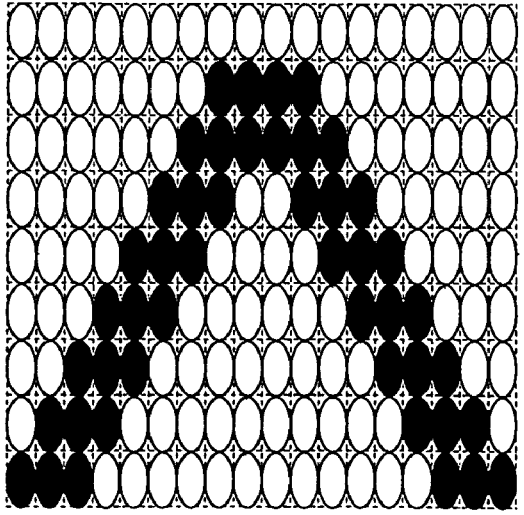

By performing a thinning-out method using replacement such as aforementioned, an image output can be performed as shown in FIG. 13A, 13B. FIG. 13A, 13B illustrate printing to be performed when data such as shown in FIG. 13A has been acquired from the application. The method of the aspect is configured such that, first, binarized first image data is created as shown in FIG. 13B, and thereafter, second image data is created to obtain an output data such as shown in FIG. 13D. In the zigzag thinning-out method of the another illustrative aspect, there is the problem that a thin line is lost or is made much thicker unless any replacement process is performed, but by using the replacement method such as aforementioned, as shown in FIG. 13D, the loss of the thin line is minimized, thus enabling appropriate density image formation.

In the another illustrative aspect, to further output a dot image corresponding to the image forming dot data in the printing section 26, the output control may be exerted to form the dot image which has a larger width than the reference dot width and has a smaller width than a dot width twice the reference dot width.

The invention is not limited to the above-aspects described in the aforementioned description and the drawings, but the following aspects are also included in the technical scope of the invention, and furthermore, the invention can be modified and practiced in various ways other than the following without departing from the scope of the invention.

(1) The aforementioned aspects have illustrated the image forming system in which the data conversion unit is disposed on the computer side and the image output unit is disposed on the image forming apparatus side. Alternatively, the function of serving as the data conversion unit, determination unit, a replacement unit and image output unit, which are disposed in this system, may be disposed inside a single image forming apparatus.

(2) In the aforementioned aspects, the dot block is configured of two-row by two-column dot data, but may include any other dot data arranged, for example, in two rows and three columns or in three rows and two columns.

According to the above-illustrative aspects, the specific array includes a second array in the dot block of which the dot data to be thinned out is configured of the image forming dot data and the non-image forming dot data, and all the dot data not to be thinned out is configured of the non-image forming dot data.

According to the above-illustrative aspects, the replacement unit replaces the data out of the second image data, which is located in a portion corresponding to the dot block determined to correspond to the specific array, with the first replacement data which includes the combination of the image forming dot data and the non-image forming dot data.

According to the above-illustrative aspects, the dot blocks are each configured of two-row by two-column dot data.

According to the above-illustrative aspects, the data conversion unit thins out the dot data out of the first image data, which configures rows or columns, every other row or every other column, and thereby converts the first image data into the second image data.

According to the above-illustrative aspects, the data conversion unit thins out the dot lines which extend along a main scan direction in the first image data, and thereby converts the first image data into the second image data.

According to the above-illustrative aspects, the data conversion unit thins out the dot data of the first image data in a zigzag manner, and thereby converts the first image data into the second image data.

According to the above-illustrative aspects, a third array is preset in the dot block of which all the dot data to be thinned out is configured as the non-image forming dot data and all the dot data not to be thinned out is configured as the image forming dot data, and the data conversion unit converts the first image data into the second image data in such a way that the data out of the second image data, which is located in a portion corresponding to the dot block which corresponds to the third array, is replaced with second replacement data which includes the combination of the image forming dot data and the non-image forming dot data.

According to the above-illustrative aspects, the dot blocks are each configured of two-row by two-column dot data, and as the specific array are preset a third array in the dot block of which all the dot data to be thinned out is configured as the non-image forming dot data and all the dot data not to be thinned out is configured as the image forming dot data, and a fourth array in the dot block of which three pieces of image forming dot data are included and all the dot data to be thinned out is configured of the image forming dot data, wherein the data conversion unit converts the first image data into the second image data in such a way that the data out of the second image data, which is located in a portion corresponding to the third array, is replaced with the second replacement data which includes the combination of the image forming dot data and the non-image forming dot data, and that the data out of the second image data, which is located in a portion corresponding to the fourth array, is replaced with third replacement data which includes the combination of only the image forming dot data.

According to the above-illustrative aspects, the image output unit, when outputting a dot image corresponding to the image forming dot data, exerts output control to form a dot image which has a larger width than a reference dot width and has a smaller width than a dot width twice the reference dot width.

According to the above-illustrative aspects, a thinning-out process can be satisfactorily performed, and image loss can be effectively suppressed in the thinning-out process. Particularly, in the case of the dot block in which all the dot data to be thinned out is the image forming dot data and all the dot data not to be thinned out is the non-image forming dot data, although considerable image forming dot data has originally been included in this dot block, the dot data remaining after being thinned out becomes the non-image forming dot data. And, unless any measures are taken, the image loss due to the thinning out becomes especially prominent. In contrast, with a configuration such that the data in such an array (first array) is replaced with the first replacement data including the image forming dot data, the image loss can be more effectively suppressed.

According to the above-illustrative aspects, it is possible to respond even to the array in which the dot data to be thinned out is configured of the image forming dot data and the non-image forming dot data, so that the effect of preventing the image loss is further improved.

According to the above-illustrative aspects, the data of the specific array includes the image forming dot data and the non-image forming dot data, and it is preferable that the data output by the image output unit in the end also reflects this specific array as much as possible. With a configuration such that a portion corresponding to the specific array is replaced with the first replacement data including the combination of the image forming dot data and the non-image forming dot data, the output image in the portion corresponding to the specific array can be formed as an appropriate density image reflecting the specific array.

According to the above-illustrative aspects, the specific array can be simplified, thus providing a configuration in which the number of kinds of arrays can be kept small, which contributes to a simplification in apparatus configuration.

According to the above-illustrative aspects, the thinning out can be performed by a simple process without using any complicated technique, and a reproduced image can easily be formed after the thinning out.

According to the above-illustrative aspects, a preferred example shows to perform the thinning-out process.

According to the above-illustrative aspects, the thinning out can be performed by a simple process without using any complicated technique, and a reproduced image can easily be formed after the thinning out.

According to the above-illustrative aspects, in the dot block of the third array, i.e., in the dot block of the array in which all the dot data to be thinned out is configured as the non-image forming dot data and all the dot data not to be thinned out is configured as the image forming dot data, although this dot block has originally included the combination of the non-image forming dot data and the image forming dot data, all the dot data remaining after being thinned out becomes the image forming dot data. Accordingly, when this image forming dot data is reproduced, a much wider image forming region than the initial first image data occurs in an image formed in the end. Thus, there is the possibility of forming an image not so much reflecting the first image data. Additionally, when such a much wider image forming portion than the first image data occurs, there is also the problem of causing the density reversal phenomenon between the image forming portion and the region which has had a higher density than this portion in the initial first image data.

According to the above-illustrative aspects, the data, which is located in a portion corresponding to the dot block which corresponds to the third array in which such a problem occurs, is replaced with the second replacement data including the combination of the image forming dot data and the non-image forming dot data. Therefore, it becomes difficult to form an image having an extremely wider region than the first image data. Accordingly, the first image data can be more properly reflected on the output image, so that the density reversal phenomenon can be effectively prevented.

According to the above-illustrative aspects, in the dot block corresponding to the third array, i.e., in the dot block of the array in which all the dot data to be thinned out is configured as the non-image forming dot data and all the dot data not to be thinned out is configured as the image forming dot data, although this dot block has included the combination of the non-image forming dot data and the image forming dot data in the initial first image data, all the dot data remaining after being thinned out becomes the image forming dot data. Accordingly, when this image forming dot data is reproduced, a dot block which has a much wider image forming region than the portion corresponding to the first image data (i.e., a dot block including only image forming dots) is configured.

In contrast, in the dot block corresponding to the fourth array, i.e., in the dot block in which three pieces of image forming dot data are included and all the dot data to be thinned out is the image forming dot data, although this dot block has had a large proportion of image forming dots in the initial first image data, image forming dots and non-image forming dots remain half-and-half, and an image formed in the end becomes an image in which image forming dots and non-image forming dots are configured half-and-half.

Unless any measures are taken against such a third array or fourth array, the fourth array portion, which has been higher in density than the third array portion in the initial first image data, becomes lower in density than the third array portion in an image formed in the end, thus causing the density reversal phenomenon.

According to the above-illustrative aspects, the data in a portion corresponding to the dot block which corresponds to the third array is replaced with the second replacement data including the combination of the image forming dot data and the non-image forming dot data. And, the data in a portion corresponding to the dot block which corresponds to the fourth array is replaced with the third replacement data including the combination of only the image forming dot data. With such a configuration, in an image formed in the end, the portion obtained by converting the fourth array becomes higher in density than the portion obtained by converting the third array, so that the density reversal phenomenon can be effectively prevented.

According to the above-illustrative aspects, the image loss can be more effectively prevented.

According to the above-illustrative aspects, the thinning-out process can be satisfactorily performed, and the image loss can be effectively suppressed in this thinning-out process.

According to the above-illustrative aspects, the thinning-out process can be satisfactorily performed, and the image loss can be effectively suppressed in this thinning-out process.

What is claimed is:

1. An image forming system, comprising:
   a data conversion unit that thins out first image data configured by arranging dot data in matrix fashion and converts two-line data of the first image data into one-line data of second image data, the dot data representing either one of image forming dot data with which an image is to be formed and non-image forming dot data with which an image is to be not formed; and
   an image output unit that outputs an image obtained by reproducing the second image data converted by the data conversion unit, wherein
   the data conversion unit includes:
   a determination unit which divides the first image data into a dot block each of which includes two-row by two-column of dot data, and determines whether or not an array of dot data included in each dot block corresponds to a first or second array, wherein the first array includes two of the image forming dots in the first row and two of the non-image forming dots in the second row, and the second array includes two of the non-image forming dots in the first row and two of the image forming dots in the second row; and an output unit which,
   when the determination unit determines that the array in a dot block corresponds to the first array, outputs the image forming data and the non-image forming data in order as a part of one-line data of the second image data,
   when the determination unit determines that the array in a dot block corresponds to the second array, outputs the non-image forming data and the image forming data in order as a part of one-line data of the second image data, and
   when the determination unit determines that the array in a dot block does not correspond to the first array nor the second array, outputs dot data in the first row of the array as a part of one-line data of the second image data.

2. The image forming system according to claim 1, wherein the row of dot data extends along a main scan direction in the first image data.

3. The image forming system according to claim 1, wherein the image output unit, when outputting a dot image corresponding to the image forming dot data, exerts output control to form a dot image which has a larger width than a reference dot width and has a smaller width than a dot width twice the reference dot width.

4. An image processing apparatus, comprising:
   a data conversion unit that thins out first image data configured by arranging dot data in matrix fashion and converts two-line data of the first image data into one-line data of second image data, the dot data representing either one of image forming dot data with which an image is to be formed and non-image forming dot data with which an image is to be not formed,
   wherein the data conversion unit includes:
   a determination unit which divides the first image data into a dot block each of which includes two-row by two-column of dot data, and determines whether or not an array of dot data included in each dot block corresponds to a first or second array, wherein the first array includes two of the image forming dots in the first row and two of the non-image forming dots in the second row, and the second array includes two of the non-image forming dots in the first row and two of the image forming dots in the second row; and
   an output unit which,
   when the determination unit determines that the array in a dot block corresponds to the first array, outputs the image forming data and the non-image forming data in order as a part of one-line data of the second image data,
   when the determination unit determines that the array in a dot block corresponds to the second array, outputs the non-image forming data and the image forming data in order as a part of one-line data of the second image data, and when the determination unit determines that the array in a dot block does not correspond to the first array nor the second array, outputs dot data in the first row of the array as a part of one-line data of the second image data.

5. An image forming apparatus, comprising:
a data conversion unit which thins out first image data configured by arranging dot data in matrix fashion and thereby converts two-line data of the first image data into one-line data of second image data, the dot data representing either one of image forming dot data with which an image is to be formed and non-image forming dot data with which an image is to be not formed; and
an image output unit which outputs an image obtained by reproducing the second image data converted by the data conversion unit,
wherein the data conversion unit includes:
a determination unit which, when the dot data is thinned out, divides the first image data into dot blocks each of which includes two-row by two-column of dot data, and determines whether or not the array of dot data included in each dot block corresponds to a first or second array, wherein the first array includes two of the image forming dots in the first row and two of the non-image forming dots in the second row, and the second array includes two of the non-image forming dots in the first row and two of the image forming dots in the second row; and
an output unit which,
when the determination unit determines that the array in a dot block corresponds to the first array, outputs the image forming data and the non-image forming data in order as a part of one-line data of the second image data,
when the determination unit determines that the array in a dot block corresponds to the second array, outputs the non-image forming data and the image forming data in order as a part of one-line data of the second image data, and
when the determination unit determines that the array in a dot block does not correspond to the first array nor the second array, outputs dot data in the first row of the array as a part of one-line data of the second image data.

6. A storage medium readable by computer, the storage medium storing a program of instructions executable by the computer to perform a function for forming an image based on first image data configured by arranging dot data in matrix fashion, the dot data representing either one of image forming dot data with which an image is to be formed and non-image forming dot data with which an image is to be not formed, the function comprising:
thinning out the first image data into second image data so as to convert two-line data of the first image data into one-line data of the second image data;
outputting an image obtained by reproducing the second image data converted by the data conversion unit;
dividing the first image data into dot blocks each of which includes two-row by two-column of dot data, when the data conversion unit thins out the dot data;
determining whether or not the array of dot data included in each dot block corresponds to a first or second array, wherein the first array includes two of the image forming dots in the first row and two of the non-image forming dots in the second row, and the second array includes two of the non-image forming dots in the first row and two of the image forming dots in the second row;
when the determination unit determines that the array in a dot block corresponds to the first array, outputting the image forming data and the non-image forming data in order as a part of one-line data of the second image data,
when the determination unit determines that the array in a dot block corresponds to the second array, outputting the non-image forming data and the image forming data in order as a part of one-line data of the second image data, and
when the determination unit determines that the array in a dot block does not correspond to the first array nor the second array, outputting dot data in the first (or second)* 1 row of the array as a part of one-line data of the second image data.

7. An image forming system, comprising:
a data conversion unit that thins out first image data configured by arranging dot data in matrix fashion and converts two-line data of the first image data into one-line data of second image data, the dot data representing either one of image forming dot data with which an image is to be formed and non-image forming dot data with which an image is to be not formed; and
an image output unit that outputs an image obtained by reproducing the second image data converted by the data conversion unit,
wherein the data conversion unit includes:
a determination unit which divides the first image data into a dot block each of which includes two-row by two-column of dot data, and determines whether or not an array of dot data included in each dot block corresponds to a first or second array, wherein the first array includes two of the image forming dots in the first row and two of the non-image forming dots in the second row, and the second array includes two of the non-image forming dots in the first row and two of the image forming dots in the second row; and
an output unit which,
when the determination unit determines that the array in a dot block corresponds to the first array, outputs the non-image forming data and the image forming data in order as a part of one-line data of the second image data,
when the determination unit determines that the array in a dot block corresponds to the second array, outputs the image forming data and the non-image forming data in order as a part of one-line data of the second image data, and
when the determination unit determines that the array in a dot block does not correspond to the first array nor the second array, outputs dot data in one row of the array as a part of one-line data of the second image data.

* * * * *